Feb. 9, 1932.  L. J. ADAMS  1,843,966
AUTOMATIC AUTOMOBILE BRAKE
Filed Dec. 13, 1930   2 Sheets-Sheet 1

Inventor
Leland J. Adams
By Lyon & Lyon
Attorneys

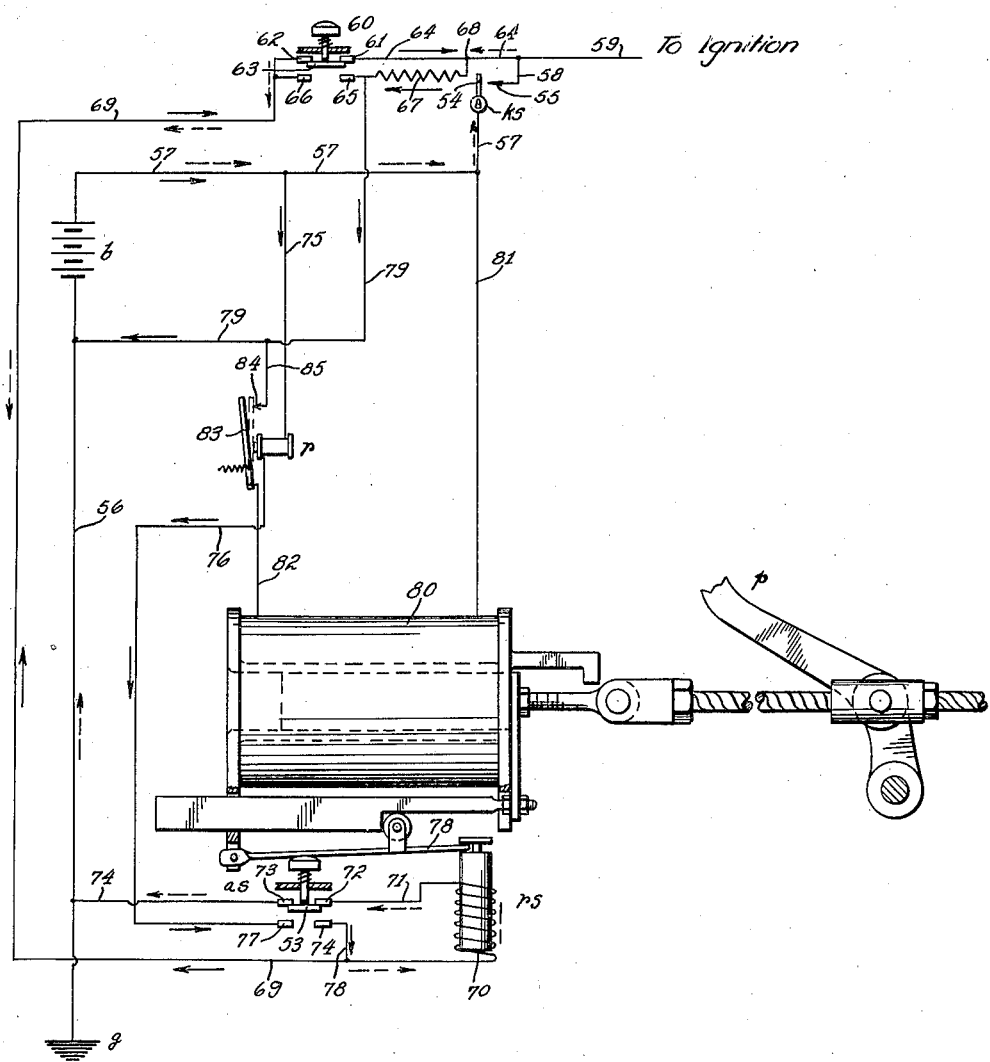

Patented Feb. 9, 1932

1,843,966

UNITED STATES PATENT OFFICE

LELAND J. ADAMS, OF BEVERLY HILLS, CALIFORNIA

AUTOMATIC AUTOMOBILE BRAKE

Application filed December 13, 1930. Serial No. 502,123.

This invention relates to an automatic brake for automobiles. More particularly, the invention concerns a brake which is controlled by the ignition switch of the automobile so that the brake becomes automatically set or held in a set position when the ignition switch is open, that is to say, when the ignition switch is in the position which opens the circuit through the ignition system.

The general object of this invention is to improve the general construction of the controlling apparatus for a brake of this type.

The controlling apparatus for the brakes includes electrically controlled releasing means for releasing the brake automatically when the ignition switch is closed. In the normal operation of the apparatus this would affect the releasing of the brakes before the engine has acquired sufficient speed to enable the car to be driven ahead and this would be a disadvantage where the car had been stopped and the brakes set on the car while standing on a hill and facing up the hill.

One of the objects of this invention is to provide brake control apparatus of this kind with means for enabling the driver of the car to hold the brakes set at will in spite of the fact that the ignition circuit is closed.

A further object of the invention is to provide control apparatus of this kind which can be applied to an ignition switch having two contacts or a single contact. In the case of a double contact switch, the control circuit can be readily closed by means of the second contact of the switch. Where the ignition switch has a single contact it will be evident that the automatic control apparatus must be made to function merely through the operation of breaking the ignition circuit.

A further object of the invention is to provide automatic electric control apparatus of this type which can be readily connected up to the usual grounded ignition circuit using the regular battery for the ignition circuit and effecting the automatic control of the brake through the agency of the usual key-controlled ignition switch.

Further objects of the invention will appear hereinafter.

The invention consists of the novel parts and combination of parts to be described hereinafter, all of which contribute to produce an efficient automatic automobile brake.

A preferred embodiment of the invention is described in the following specification, while the broad scope of the invention is pointed out in the appended claims.

In the drawings:

Figure 2 is a view similar to Figure 1 but showing the relation of the parts when the brakes are locked in their set position and illustrating the circuit arrangement of the apparatus to cooperate with an ignition switch having a single contact.

Figure 1:
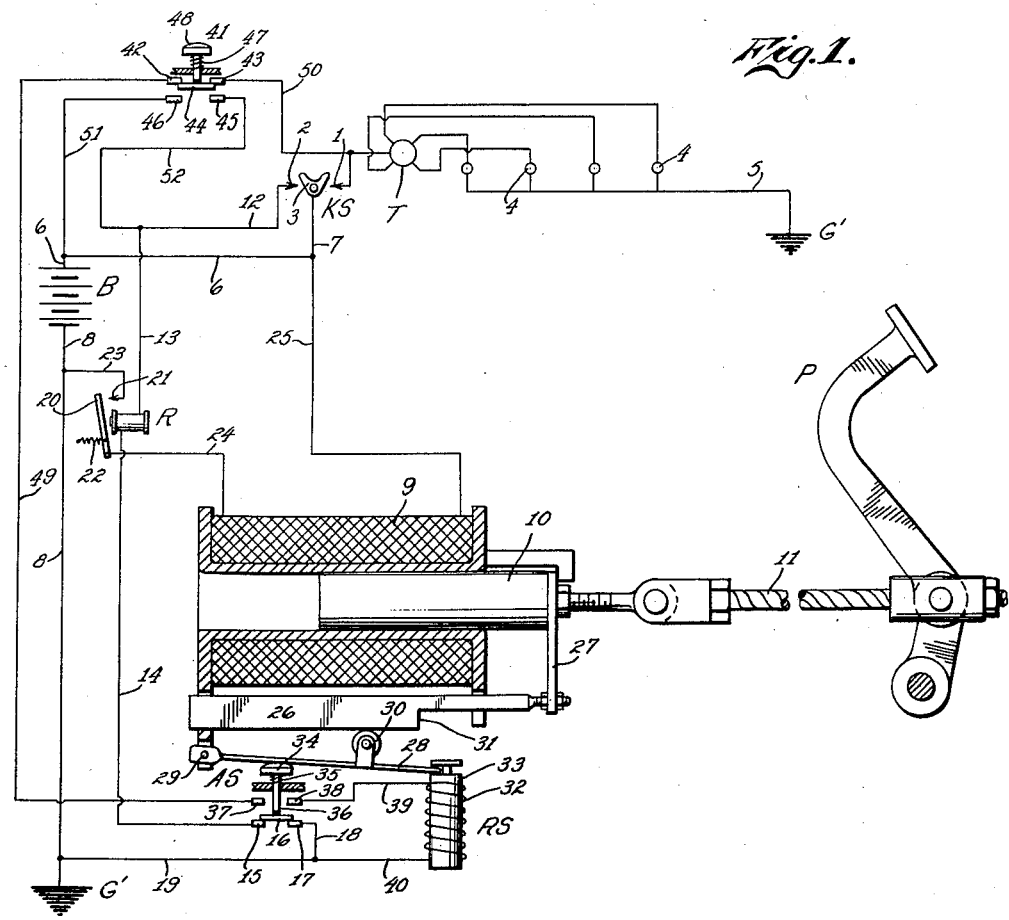
Figure 1 is a diagrammatic view illustrating my apparatus as applied to an ignition switch having two contacts and illustrating a portion of the brake pedal for applying the brakes, certain parts being broken away. This figure shows the ignition switch in a neutral position and shows the parts in the relation which they have when the brakes are "off."

Before proceeding to a detailed description of my invention, it should be stated that according to my invention, when the ignition switch (which is usually operated by a key) is drawn to its open position to open the ignition circuit the control apparatus operates automatically to apply the brakes or to lock them in their set position if they are set by other means, for example, by the brake pedal. The apparatus may include a powerful brake coil which will automatically pull the brakes to their set position and lock them there, or, if desired, the brake coil may be a relatively small coil which would operate to take up slack in a cable and thereby effect the automatic locking of the brakes in their set position. The apparatus may be applied to an ignition switch member in its closed position to supply current to the ignition circuit having a second contact which is engaged by the switch member in its open position. That is to say, in an opened condition for the ignition circuit. As the switch member touches this second contact it closes a circuit that effects the automatic application of the brake coil and the automatic locking of the brakes in their set position. In the normal operation of this apparatus, when the ignition switch is moved again to its closed position to start the engine, the lock brakes would be released through the operation of a releasing coil.

In case the driver has stopped and applied the brakes while ascending a hill it may be desirable to leave the brakes applied for a few seconds after the closing of the ignition circuit or in other words, to provide means for enabling the brakes to be maintained set although the ignition circuit is in its closed condition. For this reason, I provide hand-controlled means for controlling the circuits in such a way that at will, the regular automatic release of the brakes may be inhibited.

When my invention is applied to an ignition switch for a single contact, it will be evident that my automatic apparatus must be made to operate merely through the breaking of the ignition circuit. That is to say, without closing another circuit. In order to enable this to be accomplished, I utilize a special resistance which is imposed in the relay circuit and which prevents operation of the relay when the ignition circuit is closed, but I provide a circuit arrangement which automatically effects the operation of the relay when the ignition circuit is open. After this has been accomplished the operation of my apparatus is substantially the same as it is in the case of a two contact ignition switch.

Referring more particularly, to the parts, and especially to Figure 1, KS indicates an ignition switch provided with two contacts 1 and 2. When the switch member 3 is in a neutral position as shown, neither of these contacts is engaged but when the driver of the car wishes to start up the engine, the key is inserted and the switch member 3 thrown to the right, thereby effecting engagement with the contact 1 and closing the ignition circuit through a timer T and through spark plugs 4 and conductor 5 to a ground G'.

The current for the ignition circuit is supplied by a battery B, one side of which is connected by conductors 6 and 7 with the switch member 3. The other side being connected by a main conductor 8 with the ground G.

In applying the invention, I provide a solenoid including a brake coil 9 and a core 10, the latter being connected to a movable member such as a brake pedal P, the movement of which will apply the brake. If desired, the connection from the brake pedal to the core 10 may be in the form of a rigid tie-rod, but in Figure 1, I have illustrated the connection in the form of a cable 11. If a cable is employed the operation of the pedal to set the brakes does not move the core 10 but as soon as the core 9 is energized, the core will be moved in and take up all of the slack in the cable 11. At the same time, the core will be locked automatically in its retracted position holding the brake lock in its set position. If desired, the coil 9 may be a powerful coil sufficiently powerful to apply the brakes, that is to say, to set the brakes with sufficient force to hold the car. The control of this coil 9 is preferably effected automatically through the agency of a relay R. The coil of this relay is connected by conductors 12 and 13 to the contact 2 and when the ignition switch is in its open position, the switch member engages the contact 2 to close a branch circuit through the relay coil and through a conductor 14 to an automatic switch AS, the conductor 14 being connected to a contact 15 of this switch passing through the switch member 16 to a contact 17 and thence through wires 18, 19 and 8 back to the other side of the battery B.

The closing of the relay circuit energizes the coil of the relay and pulls the armature 20 over against contact 21 extending the spring 22 of the armature that normally holds it away from the contact 21. When the armature strikes the contact 21, a circuit is closed from one side of the battery through the conductor 8 and a conductor 23 that lead to the contact 21 thence through the armature 20 and through conductor 24 that leads from the armature and connects with one end of the coil 9. The other end of the coil 9 is connected by a conductor 25 with the junction point of conductors 6 and 7 so that an energizing circuit is closed through the coil 9. Associated with the coil 10, I provide electro-mechanical latching means and relaying means and the latching means employed controls the automatic switch AS already referred to. For this purpose, I provide a latch bar 26 that is rigidly connected by a crosshead 27 to the outer end of the core 10. This latch bar is guided to slide longitudinally with the core. Cooperating with the latch bar, I provide a latch 28 pivotally supported at 29 on a suitable pivot and this latch is provided with a projection which may include a roller 30 to engage behind a shoulder 31 formed on the latch bar 26 to hold the core 10 in its innermost position within the coil 9. By referring to Figure 2, the relation of these parts in the locked position of the core will be evident.

In order to effect the release of the brakes, I prefer to provide a releasing solenoid RS including a releasing coil 32 and a core 33, which is connected with the latch 28 so that when the core is pulled into the coil the latch will be moved down into its releasing position thereby moving the roller 30 out of the path of the shoulder 31 and permitting the brakes to release.

The automatic switch may be of the push button type illustrated, having a head 34 with a coil spring 35 under it and having a stem 36 that carries the switch member 16 of this switch in an insulated manner. This switch includes two contacts 37 and 38 corresponding to the contacts 15 and 17 already referred to. When the latch bar 26 is in its latched position, the switch member 16 bridges the contacts 37 and 38 and thereby enables the releasing circuit to be closed through the coil 32. For this purpose, I provide a conductor 39 that connects the contact 38 with one end of the coil 32 and I also provide a conductor 40 that connects the other end of the coil with the junction point of the conductors 18 and 19.

Before describing the operation of the releasing circuit, it should be stated that in order to inhibit at will the releasing of the brakes when the ignition switch KS is in its closed position (against contact 1), I provide a hand controlled switch 41 which may be of similar construction to the automatic switch AS, that is to say, it has two pairs of contacts, namely, a pair of contacts 42 and 43 which are normally bridged by the switch member 44 and a second pair of contacts 45 and 46 which are normally unconnected while the switch member 44 is maintained raised through the agency of a spring 47 around the stem of the push button 48. The contact 42 is connected by a conductor 49 with the contact 37 of the automatic switch and the contact 43 is connected by a conductor 50 with the contact 1 of the ignition switch KS. In addition to this the contact 46 is connected by a conductor 51 to the battery through a portion of the conductor 6.

The contact 45 is connected by a conductor 52 to the junction point of the wires 12 and 13.

The general mode of operation of the apparatus as illustrated in Figure 1 will now be described. When the driver of the car inserts the key in the ignition switch 3 and turns it to the right, the ignition circuit is closed from the ground G, conductor 8 and battery B, conductors 6 and 7 and through the timer and spark plugs and conductor 5 to the ground G'.

When the driver of the car opens the ignition circuit the switch member 3 comes against the contact 2 and this closes a relay circuit through wires 12 and 13 through the coil of the relay R, wire 14, contacts 15 and 17, conductors 18, 19 and 8 back to the battery. This energizes the relay coil and closes the energizing circuit for the coil 9 as follows:

From the battery through the wires 6 and 25, through the coil 9 and thence through the wire 24, armature 20, contact 21 and wires 23 and 8, back to the battery. This will pull the core 10 into the coil 9 and either apply the brakes or take up slack in the cable 11. As soon as the shoulder 31 passes the roller 30, the spring 35 will cause the latch 28 to move up to a raised position such as is illustrated in Figure 2, thereby opening the relay circuit at the contacts 15 and 17 and closing an open gap in the releasing circuit through the contacts 37 and 38.

In this way the relay circuit is prepared for automatic operation when the operator of the car again closes the ignition switch KS. Of course the opening of the relay circuit releases the armature 20 and automatically opens the energizing circuit through the coil 9. It is of course, unnecessary to maintain the coil energized because the latch bar 26 has been automatically locked to hold the brakes in a set position, by the latch 28.

When the driver of the car closes the ignition switch KS by inserting his key and rotating it to the right the switch member 3 engaging the contact 1 closes a releasing circuit from the contact 1 through the conductor 49 to the contact 37 and thence through the switch member 16 (which at this time is in its raised position) thence through contact 38 and wire 39 to the coil 32. From the coil 32 the circuit is completed through the wires 40, 19 and 8 back to the battery.

If the car is standing with the brakes applied and facing up hill the driver may desire to inhibit the automatic release of the latch bar 26. In order to accomplish this it is merely necessary for him to press down on the push button switch 41 (while the ignition switch is in its closed condition) thereby depressing the switch member 44 to open the releasing circuit at this point and bridge the contacts 45 and 46, bridging these contacts 45 and 46 closes the relay circuit through the conductors 52 and 13 and the relay circuit will, as described above, maintain the coil 9 energized. The closing of the ignition switch will, of course, effect a momentary release of the brake; this will depress the lever 28 so that the relay circuit will be properly completed through the contacts 15 and 17 when the button 41 is pressed.

However, if the latch bar has already been latched it will not be necessary for the driver to press the push button 48 far enough to bridge contacts 45 and 46. In other words, in the neutral position of the switch 41, the releasing circuit cannot be closed automatically. However, if the driver has already closed the releasing circuit by closing the ignition switch, the full depression of the push button 48 will immediately apply the brake.

As stated above, Figure 2 illustrates the adaptation of the invention for use with a key switch. That is, an ignition switch having a single contact. Referring to this figure, ks indicates the ignition switch having a switch member 54 controlled by the key. When this switch member is against contact 55, the ignition circuit is closed and this circuit passes from the ground g through wire 56 to the battery b and thence by wire 57 to the switch ks and thence through the contact 55 and wires 58 and 59 to a timer similar to the timer T, and thence to the ground as indicated in the diagram of the ignition system shown in Figure 1.

The wiring illustrated in Figure 2 is such that the mere opening of the ignition circuit effects the closing of the relay circuit. This wiring includes a special switch 60 similar to the switch 41 in Figure 1 having a pair of contacts 61 and 62 which are normally connected by the insulated switch member 63; the contact 61 is connected by a conductor or wire 64 with the junction point of the wires 58 and 59.

The special switch 60 also includes a lower pair of contacts 65 and 66, the former of which is connected to a special resistant 67, the other end of which is connected at 68 to the wire 64. The wiring also includes a conductor 69 connected with the contact 62 and 66 in parallel and this conductor 69 at its other end is connected to the coil 70 of the releasing solenoid rs. The other end of the solenoid coil 70 is connected by a wire 71 with one of the upper contacts 72 of the automatic switch as which switch, when in its raised position, connects the contact 72 to the opposite contact 73 to its insulated switch member 53. The contact 73 is connected by a wire 74 to the conductor 56. The relay circuit is formed through a wire 75 that extends down from the wire 57 and connects with the coil of the relay r, the other end of the relay coil being connected to a wire 76 that is connected to the lower contact 77 opposite the contact 74. The contact 74 connected by a wire 78 with the wire 69.

In the operation of this apparatus as illustrated in Figure 2 when the driver of the car opens the ignition switch, a relay circuit is established as indicated by the full-line arrows on the diagram. This circuit is as follows:

From the positive side of the battery thereon through wires 57 and 75 to the relay r and thence by wire 76 to the contact 77. At this time the brakes will be in their "off" position and consequently the latch 78 will be down as indicated in Figure 1; therefore, the switch member 53 will connect the contact 77 and 74.

The circuit passes from contact 74 by a wire 78 to the wire 69 up to the upper contact 62 of the special switch 60 and thence by switch member 63 through contact 61 and wire 64 through the resistance 67 and thence the wire 79 to the other side of the battery. This closes the relay circuit and the energizing circuit for the brake coil 80 is then established as follows:

From the battery b through the wire 57 and wire 81 to the coil 80 and thence by wire 82 to the armature 83, armature contact 84 and wire 85 to the wire 79. This will cause the brake coil to set the brakes by pulling of the pedal as indicated in Figure 2. When the driver of the car closes the ignition switch, a releasing circuit is established by passing through the releasing coil 70 as indicated by the dotted-line arrows. That is to say, a circuit is established from the positive side of the battery b through wire 57 to the ignition switch and from the ignition switch through wire 64, contacts 61, 63 and 62 and thence by wire 71, contacts 72, 53 and 73 through wire 74 to the wire 56 and thence to the negative side of the battery b. This will pull the latch 78 to its releasing position and release the brakes.

The special switch 60 and the automatic switch as operate in this embodiment of the invention in the same way as in the embodiment illustrated in Figure 1.

It will be noted that in both embodiments of the invention the usual grounded ignition circuit is not disturbed by my control wiring imposed on it, using metallic controlling circuits.

The resistance 67 should be so high that it will not operate to short-circuit the ignition system from the point 68 through the wire 79 after the ignition switch has been closed.

While I have illustrated a battery for supplying the current in this apparatus it should be understood that any source of electromotive force may be employed.

It is understood that the embodiment of the invention described herein is only one of the many embodiments this invention may take, and I do not wish to be limited in the practice of the invention, nor in the claims, to the particular embodiment set forth.

I claim:

1. In an electrically controlled brake apparatus, the combination of a movable member for setting the brakes, electro-magnetic means associated with the said member for holding the brakes in their set position, an ignition switch, a circuit connected with said electro-magnetic means and controlled by the ignition switch for controlling said electro-magnetic means to release the brake and normally operating to release the brake when the ignition circuit is placed in a position to close the ignition circuit, and hand controlled means in the first-named circuit for controlling the same independently of the ignition switch and enabling the brakes to be held in a set position at will when closing the ignition circuit.

2. In an electrically controlled brake apparatus the combination of a movable member for setting the brakes, electro-magnetic means associated with the said member and including locking means for locking the brakes automatically in their set position, an ignition switch, a branch circuit including a releasing coil connected with the said locking means and controlled by the ignition switch for controlling the locking device to release the brake, and operating to release the brakes when the ignition switch is closed, and automatic means for opening the releasing circuit when the brakes are in their "off" position.

3. In an electrically controlled brake apparatus, the combination of a battery, a conductor grounding the battery on one side, an ignition system grounded on one side, an ignition switch connected up between the battery and the ignition system for closing a grounded circuit through the ignition system, a movable member for setting the brakes, a solenoid including a brake coil and a core for actuating said movable member, a metallic circuit connecting the battery with the solenoid coil, automatic means controlled by the ignition switch for closing the metallic circuit through the solenoid coil to set the brakes automatically when the ignition circuit is opened at the ignition switch, and automatic means for effecting the release of the brakes when the ignition switch is moved into its closed position.

4. In an electrically controlled brake apparatus, the combination of a movable member for setting the brakes, a solenoid comprising a brake coil and core connected with the brakes, an ignition switch for closing the ignition circuit, electro-magnetic means controlled by the ignition switch when in its open position for closing a circuit through the brake coil to advance the core into the coil, automatic latch means for latching the core in the coil to lock the brakes in their set position, and electro-magnetic means for releasing the latch, with circuits controlling the same to release the core when the ignition switch is moved to its closed position, said electro-magnetic means including a releasing coil and a circuit passing through the releasing coil, and means actuated by the releasing movement of the latch to open the circuit through the releasing coil.

5. In an electrically controlled brake apparatus, the combination of a movable member for setting the brakes, a solenoid comprising a brake coil and core connected with the brakes, an ignition switch for closing the ignition circuit, electro-magnetic means controlled by the ignition switch when in its open position for closing a circuit through the brake coil to advance the core into the coil, automatic latch means for latching the core in the coil to lock the brakes in their set position, and electro-magnetic means for releasing the latch, with circuits controlling the same to release the core when the ignition switch is moved to its closed position, said electro-magnetic means including a releasing coil and a circuit passing through the releasing coil, means actuated by the releasing movement of the latch to open the circuit through the releasing coil, a circuit having a branch with a relay for closing the circuit through the first named solenoid coil, and hand controlled means in the circuit for enabling the brake coil to be maintained energized when the ignition switch is in a position to close the ignition circuit.

6. In an electrically controlled brake apparatus, the combination of a movable member for setting the brakes, a brake coil, a core for the brake coil connected with said member, an ignition switch, a relay circuit with a relay therein and capable of being closed by the ignition switch when in its open position, said relay operating to close a circuit through the brake coil, a spring-actuated latch for latching the core in a position to hold the brake set, a relay coil associated with the latch, with means for energizing the same to release the latch when the ignition switch is moved to its closed position, and hand controlled means adjacent the ignition switch for maintaining a circuit through the brake coil at will when the ignition switch is moved to its closed position.

7. In an electrically controlled brake apparatus, the combination of a movable member for setting the brakes, a brake coil, a core for the coil connected with said member, a battery and ignition system with an ignition switch connected up between the battery and the ignition system and having a closed position for closing the ignition circuit and an open position for opening the circuit through the ignition system, a branch circuit including a relay with means controlled by the relay for closing the circuit through the brake coil capable of being closed by the ignition switch when in said open position, a latch cooperating with said coil for holding the brakes in their set position, a releasing solenoid including a releasing coil and a core connected with the latch for releasing the brakes, with a branch circuit through the releasing coil closed by the ignition switch when in its closed position, and a switch controlled by the said latch and operating to open the branch circuit through the releasing coil when the latch is in its releasing position.

8. In an electrically controlled brake apparatus, the combination of a movable member for setting the brakes, a brake coil, a core for the same connected with said movable member, an ignition switch having a single contact for closing the ignition circuit, a battery, a branch circuit connecting the said contact with one side of the battery and including a resistance, a relay having a coil in the branch circuit connected at one end with the other side of the battery, and connections cooperating with the relay to enable the same to close a circuit through the brake coil when the ignition switch is out of engagement with its contact, said resistance operating to prevent actuation of the relay when the ignition circuit is closed.

9. In an electrically controlled brake apparatus, the combination of a movable member for setting the brakes, a brake coil, a core for the same connected with said movable member, an ignition switch having a single contact for closing the ignition circuit, a battery, a branch circuit connecting the said contact with one side of the battery and including a resistance, a relay having a coil in the branch circuit connected at one end with the other side of the battery, connections co-operating with the relay to enable the same to close a circuit through the brake coil when the ignition switch is out of engagement with its contact, said resistance operating to prevent actuation of the relay when the ignition circuit is closed, a latch cooperating with the core to lock the brakes in their set position, a releasing coil cooperating with the latch to release the same, and means for effecting the closing of the circuit through the releasing coil when the ignition switch is against said contact.

10. In an electrically controlled brake apparatus, the combination of a movable member for setting the brakes, a brake coil, a core for the same connected with said movable member, an ignition switch having a single contact for closing the ignition circuit, a battery, a branch circuit connecting the said contact with one side of the battery and including a resistance, a relay having a coil in the branch circuit connected at one end with the other side of the battery, connections co-operating with the relay to enable the same to close a circuit through the brake coil when the ignition switch is out of engagement with its contact, said resistance operating to prevent actuation of the relay when the ignition circuit is closed, a latch cooperating with the core to lock the brakes in their set position, a releasing coil cooperating with the latch to release the same, means for effecting the closing of the circuit through the releasing coil when the ignition switch is against said contact, and hand controlled means for maintaining the circuit through the brake coil at will when the ignition switch is in its closed position.

11. In an electrically controlled brake apparatus, the combination of electro-magnetic means for controlling the brakes, an ignition switch having a single contact for closing the ignition circuit, means brought into operation by moving the ignition switch member out of engagement with the said single contact for controlling said electro-magnetic means, and hand controlled means independent of the ignition switch for inhibiting the operation of the said electro-magnetic means.

12. In an electrically controlled brake apparatus, the combination of electro-magnetic means for controlling the brakes, an ignition switch having a contact for closing the ignition circuit and having a second contact for closing a control circuit when the ignition circuit is open, means connecting said second contact with said electro-magnetic means for controlling the brakes when the ignition circuit is open, and hand controlled means independent of the ignition switch for inhibiting the operation of the said electro-magnetic means.

Signed at Los Angeles, California, this 8th day of December, 1930.

LELAND J. ADAMS.